(12) United States Patent
Miao (10) Patent No.: US 8,705,177 B1
(45) Date of Patent: Apr. 22, 2014

(54) INTEGRATED NEAR-TO-EYE DISPLAY MODULE

(75) Inventor: Xiaoyu Miao, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 94 days.

(21) Appl. No.: 13/311,021

(22) Filed: Dec. 5, 2011

(51) Int. Cl.
  *G03H 1/02* (2006.01)
  *G02B 27/14* (2006.01)
  *G09G 5/00* (2006.01)

(52) U.S. Cl.
  USPC .................................. 359/630; 359/13; 345/8

(58) Field of Classification Search
  USPC .................. 359/13, 629–633; 345/8
  See application file for complete search history.

(56) References Cited

U.S. PATENT DOCUMENTS

| | | | |
|---|---|---|---|
| 5,926,318 | A | 7/1999 | Hebert |
| 5,943,171 | A | 8/1999 | Budd et al. |
| 2003/0030597 | A1* | 2/2003 | Geist .................................. 345/8 |
| 2010/0149073 | A1 | 6/2010 | Chaum et al. |
| 2011/0213664 | A1 | 9/2011 | Osterhout et al. |

* cited by examiner

*Primary Examiner* — Mahidere Sahle
(74) *Attorney, Agent, or Firm* — Blakely Sokoloff Taylor & Zafman LLP (57) ABSTRACT

A head mounted display ("HMD") includes a frame assembly for wearing on a head of a user and an integrated display module mounted to the frame assembly within a peripheral viewing region of an eye of the user when the HMD is worn by the user. The integrated display module includes a display source for outputting a computer generated image ("CGI"), a lens system optically aligned with the display source to focus the CGI emitted from the integrated display module towards the eye, and an actuator coupled to adjust a focal distance of the lens system for changing an image depth of the CGI displayed to the user.

26 Claims, 6 Drawing Sheets

INTEGRATED NEAR-TO-EYE DISPLAY MODULE

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a method for operating, and apparatus for implementing, a head mounted display ("HMD") with an integrated near-to-eye display module are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

See-through near-to-eye displays impose a number of technical difficulties as the optics in front of the eye need to be transparent while having the capability to steer the CGI light towards the user's eye. One technique to solve this problem of see-through near-to-eye displays is to centrally position a beam splitter cube in front of the user's forward vision, which can transmit ambient scene light to the user's eye while reflecting the CGI light from an image source into the eye. However, such implementations can be bulky and create industrial design issues. Other techniques may use partially reflective mirrors, surface distributed micro-mirrors, or diffraction gratings, which can effectively reduce the thickness of the optical eyepiece. Nevertheless, these approaches often use fully collimated light reflected internally a number of times, which requires tight design/fabrication tolerances of the optical assembly. The multiple internal reflections have the sum effect of magnifying any design/fabrication errors with each additional reflection. These designs can also suffer from poor image sharpness or ghosting, if the constituent optical surfaces are not sufficiently aligned.

One technique to circumvent many of these design/fabrication challenges associated with see-through near-to-eye displays, is to use an opaque, compact form factor integrated display module that is aligned to project the CGI image into the user's eye. If the integrated display module is sufficiently small (e.g., less than 10 mm by 10 mm by 10 mm) and mounted in the user's peripheral vision so as not to obstruct their central forward vision, the user will still have an acceptable view of the ambient real-world. By removing the see-through requirement of alternative HMD or near-to-eye display technologies, a number of design constraints are relaxed. A number of HMD configurations using an opaque integrated display module as described herein. These configurations provide for an integrated display module having a small form factor, which outputs CGI having a large field of view, with high system efficiency (e.g., low optical loss), lower power consumption, light weight, reduced cost, ease of manufacturing, and high reliability.

Figure 1:
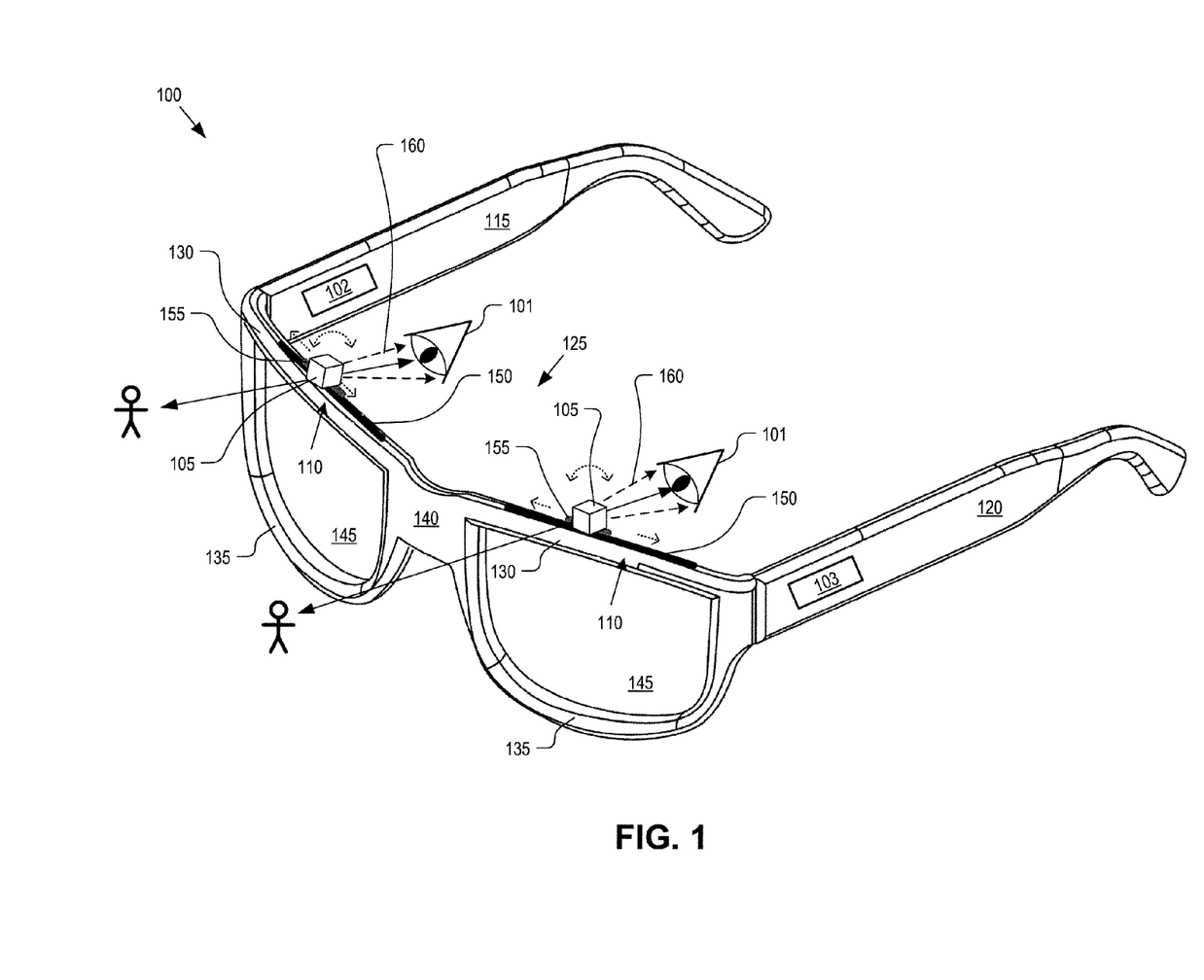
FIG. 1 is a perspective view of a head mounted display ("HMD") including an integrated near-to-eye display module, in accordance with an embodiment of the disclosure.

FIG. 1 is a perspective view of a head mounted display ("HMD") 100 including an integrated near-to-eye display module, in accordance with an embodiment of the disclosure. The illustrated embodiment of HMD 100 includes a frame assembly, a computer generated image ("CGI") engine 102, a controller 103, integrated display modules 105, and adjustable mounts 110. The illustrated embodiment of the frame assembly includes right temple arm 115, left temple arm 120 and frontal member 125. The illustrated embodiment of frontal member 125 includes upper lens supports 130 (a.k.a. brow members 130), lower lens supports 135, nose bridge 140, and eyepieces 145. The illustrated embodiment of adjustable mounts 110 includes a sliding track 150 and a tilting mount 155.

The illustrated embodiment of the frame assembly is secured into an eyeglass arrangement that can be worn on the head of a user. The right and left temple arms 115 and 120 extend along the temple region of the user and rest over the user's ears while nose bridge 140 rests over the user's nose. The frame assembly is shaped and sized to position each eyepiece 145 in front of a corresponding eye 101 of the user. Although FIG. 1 illustrates a traditional eyeglass shaped frame assembly, embodiments of the present invention are applicable to a wide variety of frame types and styles. For example, lower lens supports 135 may be omitted, upper lens supports 130 may be omitted, eyepieces 145 may be rigid optical eyepieces that also function as structural frame members themselves to which integrated display modules 105 may be mounted, the frame may assume a visor-like shape, headband, goggles, or otherwise. Although FIG. 1 illustrates a binocular HMD having two integrated display modules 105, one for each eye 101, HMD 100 may also be implemented as a monocular HMD including only a single integrated display module 105 positioned to emit CGI to a single eye 101.

The illustrated embodiment of HMD 100 is capable of displaying an augmented reality or heads up display to the user. CGI light 160 is emitted from integrated display modules 105. Integrated display modules 105 are mounted in the user's peripheral vision so as not to obstruct the central forward vision of the external real world. For example, integrated display modules 105 are mounted on brow members 130 and aligned to emit CGI light 160 down into eyes 101. Left and right (binocular embodiment) CGI light 160 may be output based upon image data generated by one or two CGI engines 102 communicatively coupled to display sources within integrated display modules 105. CGI light 160 may be viewed by the user as a virtual image superimposed over the real world as an augmented reality. In some embodiments, ambient scene light may be blocked, selectively blocked, or partially blocked by eyepieces 145 including an adjustable transparency shutter (e.g., active LCD shutter). Eyepieces 145 may or may not be corrective lenses with optical power and in some embodiments may even be omitted.

In the illustrated embodiment, integrated display modules 105 are fixed to the frame assembly using adjustable mounts 110. Adjustable mounts 110 permit the user to adjust the position and orientation of integrated display modules 105 for alignment with eyes 101. For example, the illustrated embodiment of adjustable mounts 110 includes sliding tracks 150 for adjusting the horizontal or lateral position of integrated display modules 105. Horizontal adjustment accommodates different eye separation lengths by different users. The illustrated embodiment of adjustable mounts 110 further includes tilt mounts 155. Tilt mounts 155 provide a mechanism to adjust the tilt or pitch of integrated display modules 105 to vertically align the emitted CGI light 160 into eyes 101. Sliding tracks 150 and tilt mounts 155 may require manual adjustment (e.g., using mechanical friction to retain their position) or use active adjustment with electromechanical actuators controlled by controller 103. For example, sliding tracks 150 may be driven by a corkscrew gear, a belt drive, or otherwise.

CGI engine 102 and controller 103 are disposed in or on the frame assembly. CGI engine 102 may include a processor and graphics engine for rendering image data. Controller 103 may include an integrated circuit with hardware, firmware, or software logic. Collectively, CGI engine 102 and controller 103 are the control system of HMD 100 (see FIG. 5).

Figures 2A, 2B, 2C, 3:
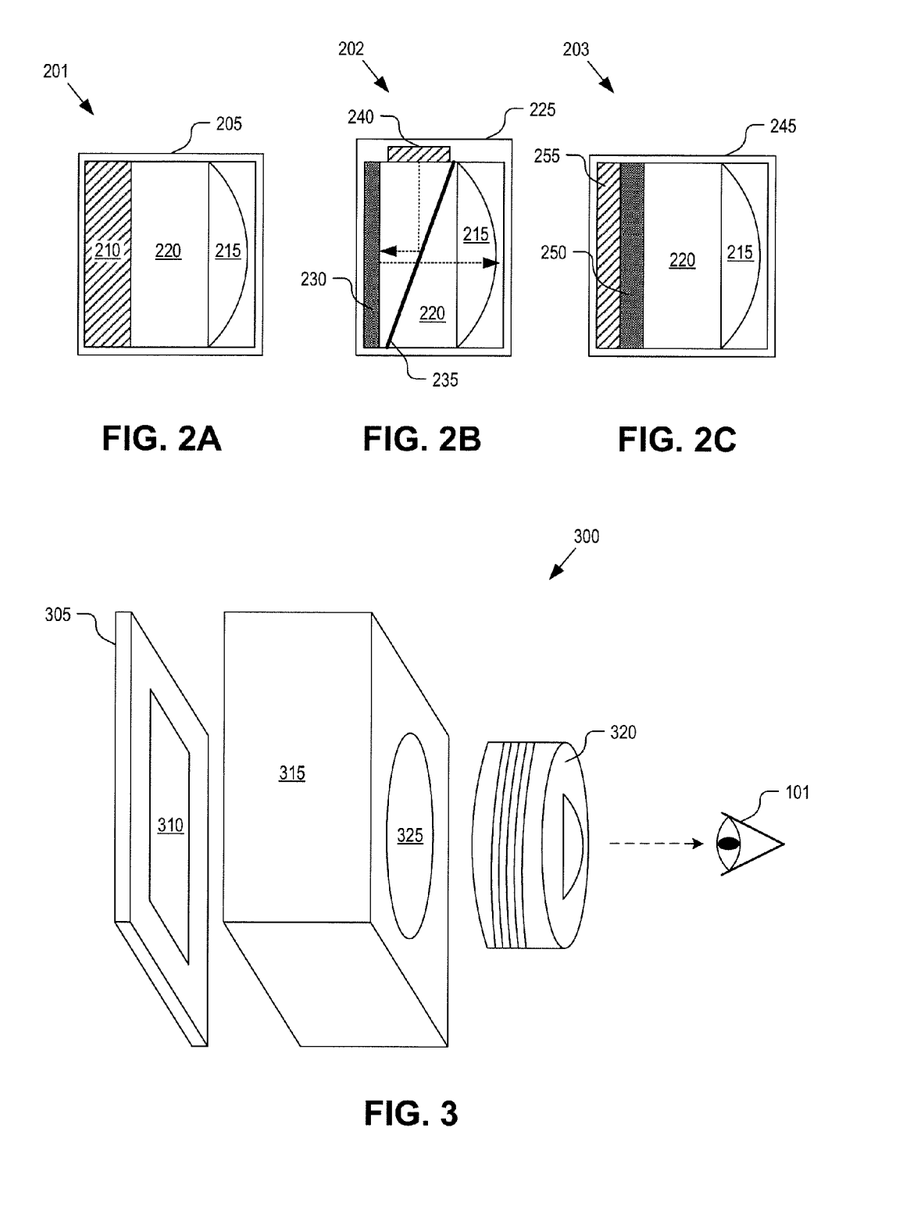
FIGS. 2A-C illustrate three configurations for implementing an integrated near-to-eye display module, in accordance with an embodiment of the disclosure.
FIG. 3 is a perspective view illustrating an integrated near-to-eye display module implemented with a barrel-shaped actuator housing, in accordance with an embodiment of the disclosure.

FIGS. 2A-C illustrate three configurations for implementing an integrated near-to-eye display module, in accordance with an embodiment of the disclosure. FIG. 2A-C illustrate possible implementations of integrated display module 105 of FIG. 1. Each implementation of integrated display module 105 includes a display source, a lens system, and an actuator for manipulating the magnification power of the display source by the lens system. The display sources can be subdivided into active display sources and passive display sources. Passive display sources may also be referred to as externally illuminated display sources.

FIG. 2A is a functional block diagram illustrating an integrated display module 201 implemented using an active display panel, in accordance with an embodiment of the disclosure. The illustrated embodiment of integrated display module 201 includes a housing 205, an active display panel 210, a projection lens 215, and an actuator 220. Active display panel 210 may be implemented as a light emitting diode ("LED") array, organic LED ("OLED") array, or a quantum dot array. Active display panel 210 does not require external illumination by a lamp source, but rather directly emits light. Projection lens 215 may be implemented as a refractive lens made of plastic or glass, a Fresnel lens, a microlens array, a diffraction grating, a liquid crystal lens, a variable liquid lens, or otherwise. Actuator 220 couples to projection lens 215 to manipulate projection lens 215, thereby altering the magnification of the CGI light 160 emitted from active display panel 210. Actuator 220 may be implemented using a variety of compact actuation technologies including voice coil motors ("VCMs"), piezoelectric actuators, shaped alloy actuators, micro-electro-mechanical-systems ("MEMS") actuators, or otherwise. These actuators operate to mechanically move projection lens 215 relative to active display panel 210. This relative movement serves to change the offset between the focal point of projection lens 215 and the emission surface of active display panel 210, which in turn changes the magnification. The magnification factor is linked to the virtual image location or image depth and can serve as a mechanism by which virtual image location or image depth, as perceived by the eye, can be adjusted. The magnification factor increases, if active display panel 210 is within a focal distance from projection lens 215, as the offset increases. In an embodiment where projection lens 215 is implemented as a liquid lens, then actuator 220 may be implemented as a voltage source and electrodes that alter the lens shape via an applied variable bias voltage.

FIG. 2B is a functional block diagram illustrating an integrated display module 202 implemented using a reflective passive display panel, in accordance with an embodiment of the disclosure. The illustrated embodiment of integrated display module 202 includes a housing 225, a passive display panel 230, a beam splitter 235, projection lens 215, actuator 220, and lamp 240. Passive display panel 230 may be implemented as a liquid crystal on silicon ("LCoS") panel, a digital micro-mirror display, or other front illuminated display technologies. Passive display panel 230 requires external front illumination by lamp 240. Lamp 240 may be an LED, laser, fluorescent light, or otherwise. The emitted lamp light is reflected onto the surface of passive display panel 230 by beam splitter 235. In one embodiment, beam splitter 235 is a polarizing beam splitter ("PBS"). Passive display panel 230 modulates or otherwise imparts image data onto the lamp light via selective reflection to generate CGI light 160. CGI light 160 then passes through beam splitter 235 and is controllably magnified by projection lens 215 before being emitted from housing 225.

FIG. 2C is a functional block diagram illustrating an integrated display module 203 implemented using a transmissive passive display panel, in accordance with an embodiment of the disclosure. The illustrated embodiment of integrated display module 203 includes a housing 245, a passive display panel 250, projection lens 215, actuator 220, and backlight 255. Passive display panel 250 may be implemented as a liquid crystal display. Passive display panel 250 requires external back illumination by backlight 255. Backlight 255 may be an LED, laser, fluorescent light, or otherwise. The lamp light emitted from backlight 255 selectively passes through display panel 250, which modulates image data onto the light via selectively blocking the light to generate CGI light 160. CGI light 160 then passes through projection lens 215 and is controllably magnified before being emitted from housing 245.

FIG. 3 is a perspective view illustrating an integrated display module 300 implemented with a barrel-shaped actuator housing, in accordance with an embodiment of the disclosure. Any one of integrated display modules 105, 201, 202, or 203 may be implemented as illustrated in FIG. 3. Integrated display module 300 includes a base 305, a display panel 310, a housing 315 in which an actuator (e.g., barrel shaped VCM) is disposed, and a projection lens 320 that threads into barrel 325 of housing 315. Integrated display module 300 is a compact, fully integrated module that emits its CGI light directly onto the user's eye 101 through free space air. Since intervening light bending or light guiding optics are not used, the fabrication tolerances and costs can be reduced, while field of view, eyebox, and efficiency can be increased.

Figure 4A:
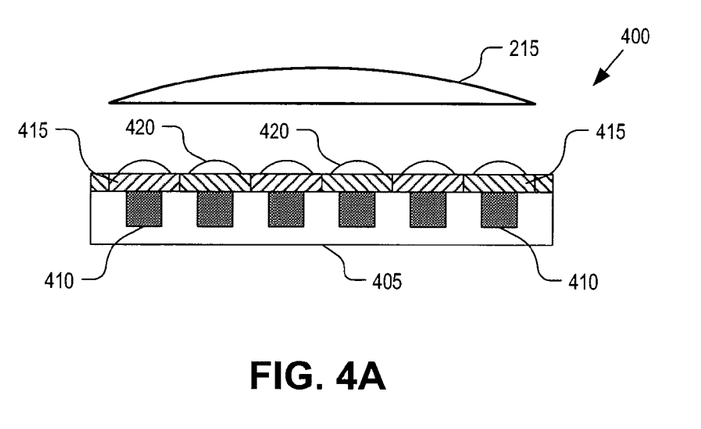
FIG. 4A is a block diagram illustrating a cross-sectional view of a display panel for use in an integrated near-to-eye display module, in accordance with an embodiment of the disclosure.

FIG. 4A is a block diagram illustrating a cross-sectional view of an active display panel 400 for use in an integrated near-to-eye display module, in accordance with an embodiment of the disclosure. Active display panel 400 is one possible implementation of active display panel 210 illustrated in FIG. 2A. The illustrated embodiment of active display panel 400 includes a substrate 405, an array of display pixels 410, a color filter array ("CFA" 415), and an array of microlenses 420. Projection lens 215 is positioned over active display panel 400. Display pixels 410 may be white light LEDs while CFA 415 may include three different color filters (e.g., red, green, blue; cyan, yellow, magenta; etc.). Alternatively, CFA 415 may be omitted, in which case either the individual display pixels 410 emit different colors (e.g., array of multi-color LEDs) or active display panel 400 may be implemented as a monochrome display. Microlenses 420 provide a first level of fixed focusing power, while projection lens 215 provides a second level of adjustable focusing/magnification power for projecting the CGI image into the eye.

Figure 4B:
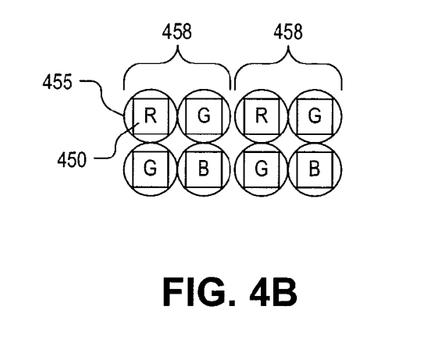
FIG. 4B is a plan view illustrating a microlens array configuration for implementing a display panel for use in an integrated near-to-eye display module, in accordance with an embodiment of the disclosure.
Figure 4C:
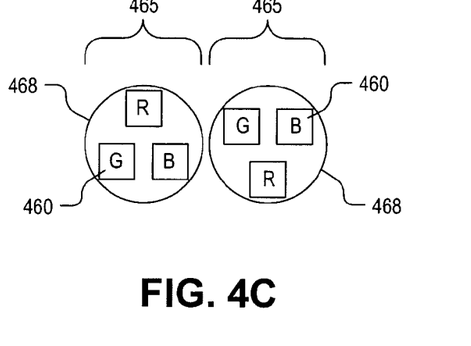
FIG. 4C is a plan view illustrating another microlens array configuration for implementing a display panel for use in an integrated near-to-eye display module, in accordance with an embodiment of the disclosure.

Microlenses 420 may be disposed on active display panel 400 using a variety of different configurations. For example, FIG. 4B is a plan view illustrating a microlens array configuration where each display pixel 450 is optically aligned with its own overlaying microlens 455. The individual pixels 450 may be organized into macro-pixel groups 458 that include multiple pixels to form a color display (e.g., using a Bayer pattern having one red, one blue, and two green pixels per macro-pixel group 458). Of course, macro-pixel groups 458 may be implemented with other color combinations having three or more individual pixels per macro-pixel group. FIG. 4C is a plan view illustrating another microlens array configuration where multiple individual pixels 460 within a macro-pixel group 465 share a common overlaying microlens 468. Other combinations of monochrome or color pixels with individual or shared overlaying microlenses may be used.

Figure 5:
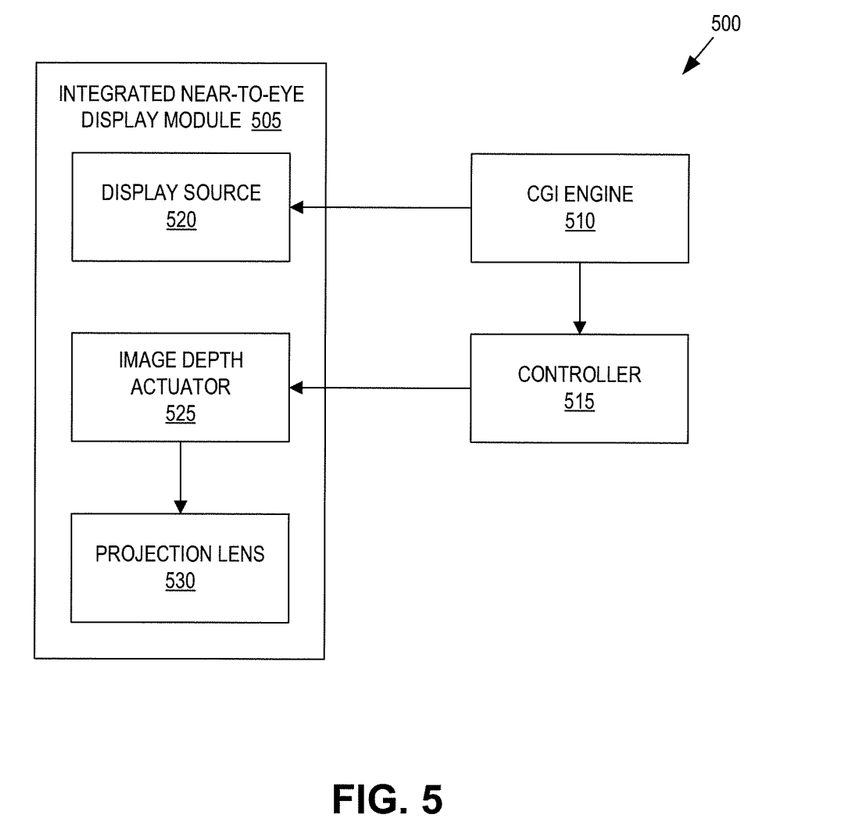
FIG. 5 is a functional block diagram illustrating a control system for operating an integrated near-to-eye display module, in accordance with an embodiment of the disclosure.

FIG. 5 is a functional block diagram illustrating a control system 500 for operating integrated near-to-eye display module 505, in accordance with an embodiment of the disclosure. The illustrated embodiment of control system 500 includes a CGI engine 510 and a controller 515. The illustrated embodiment of integrated display module 505 is a functional block representation of components of integrated display modules 105 illustrated in FIG. 1. Integrated display module 505 includes a display source 520 (e.g., any of display panels 210, 230, or 250), an image depth actuator 525 (e.g., actuator 220), and a projection lens 530 (e.g., projection lens 215).

CGI engine 510 includes a video graphics engine for generating/rendering computer images and is coupled to control display source 520. Display source 520 includes a light engine, which outputs the CGI light based upon the CGI data provided by CGI engine 510. Controller 515 includes logic for controlling the image depth of the CGI light. The logic implemented by controller 515 may be embodied in software, firmware, hardware, or a combination thereof. For example, controller 515 may include a general purpose processor with executable software/firmware instructions. Controller 515 may also include various hardware logic, such as application specific integrated circuit ("ASIC"), field programmable gate arrays ("FPGAs"), etc.

The image depth is controlled by manipulating projection lens 530 via image depth actuator 525. As discussed above, image depth actuator 525 may be implemented using any of a VCMs, piezoelectric actuator, shaped alloy actuator, MEMS actuator, or otherwise. Projection lens 530 may be implemented using any of a conventional refractive lens, a Fresnel lens, a diffraction grating, a liquid crystal lens, an array of microlenses, a liquid lens, or otherwise. In an embodiment where projection lens 530 is implemented using a liquid lens, then image depth actuator 525 may be implemented as a variable voltage source.

In the illustrated embodiment, controller 515 is further coupled to CGI engine 510 to receive metadata from CGI engine 510. The metadata received by controller 515 is associated with or keyed to the CGI data sent to display source 520. Controller 515 uses the metadata to determine or set an image depth for the associated CGI light being emitted from display source 520 to the user. Thus, the metadata is used by controller 515 to manipulate projection lens 530 in real-time thereby changing the image depth of the displayed CGI light. The metadata may be associated with a given image frame, group of image frames, or image file. Thus, controller 515 can adjust the image depth by manipulating the magnification provided by projection lens 530 in real-time. These adjustments can be performed between each frame, between groups of frames, or for each image/source file.

In one embodiment, the metadata may include a category indication that is context sensitive to items displayed within the associated CGI light. For example, CGI engine 510 may include within the metadata an indication whether the associated CGI includes a textual message, an icon, a picture, or other category. In response, controller 515 can select a textual depth setting, an icon depth setting, a picture depth setting, or other category depth setting, respectively, to adjust the magnification provided by projection lens 530. In this manner, different default depth settings can be selected in a context sensitive manner dependent upon what is currently being displayed.

Figure 6:
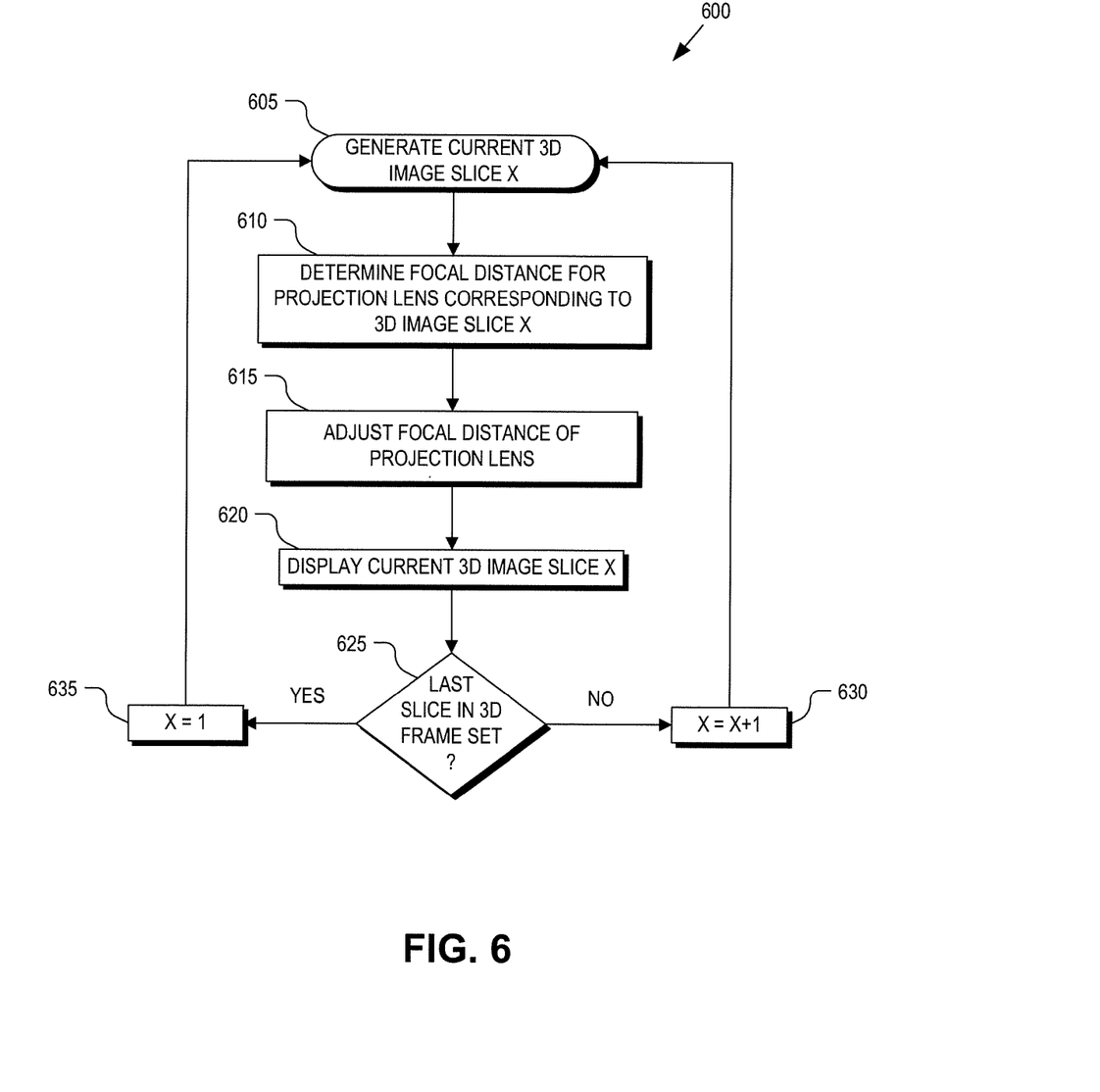
FIG. 6 is a flow chart illustrating a process for operating an integrated near-to-eye display module on a HMD for generating a pseudo 3-dimensional ("3D") image, in accordance with an embodiment of the disclosure.

FIG. 6 is a flow chart illustrating a process 600 for operating integrated near-to-eye display module 505 or 105 for generating a pseudo 3-dimensional ("3D") image, in accordance with an embodiment of the disclosure. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

Figure 7:
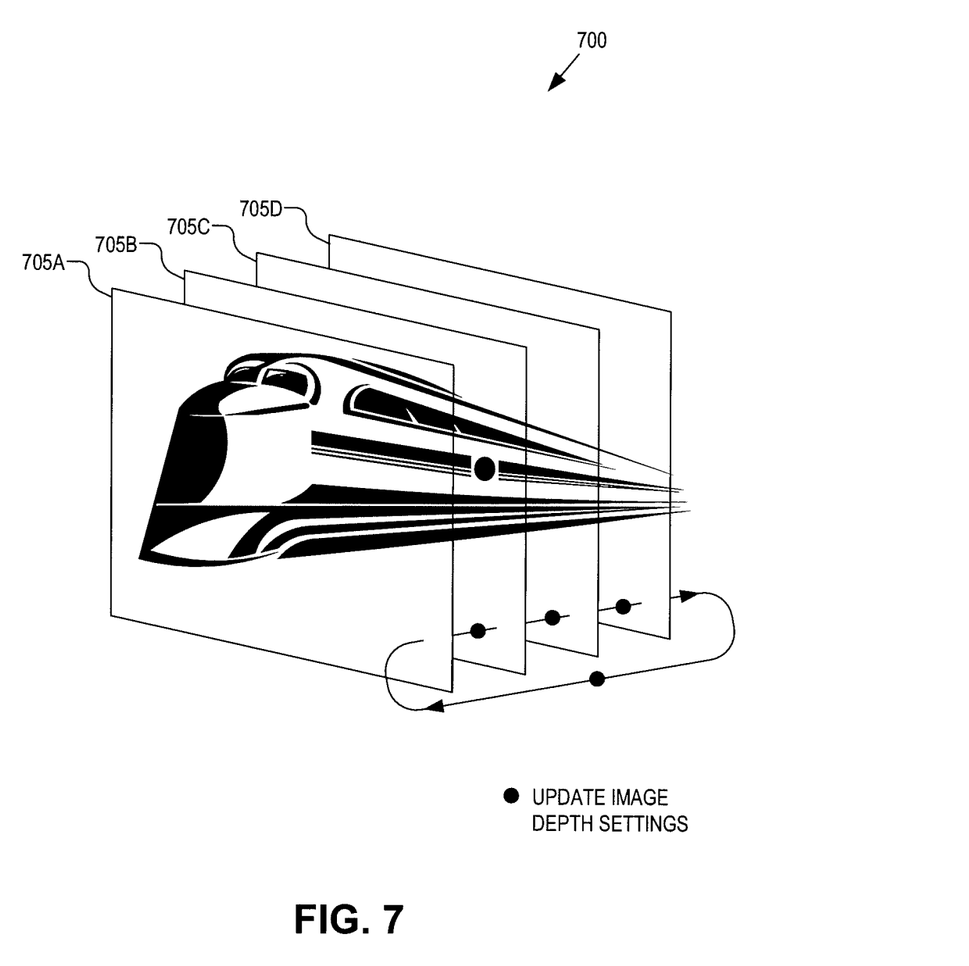
FIG. 7 illustrates image slices of a 3D frame set, in accordance with an embodiment of the disclosure.

The real-time manipulation of the magnification provided by projection lens 530, enables control system 500 to implement a pseudo-3D image by rapid, sequential adjustments to the image depth. Referring to FIG. 7, a pseudo-3D image is a 3D frame set 700 made up of individual image slices 705A-D that are rapidly displayed to the human eye with each 3D image slice 705 projected with a different zoom or image depth. In one embodiment, each 3D image slice 705 is an cross-sectional image at a different offset in the overall 3D image. By selecting an appropriate magnification when displaying each offset 3D image slice 705, a pseudo-3D image having 3D depth is displayed to the viewer. In one embodiment, image slices 705 are repetitiously and sequentially displayed and the image depth settings are updated between each 3D image slice 705.

In a process block 605, CGI engine 510 generates the current image slice. In one embodiment, each 3D image slice 705 has an associated image depth setting. This image depth setting may be communicated to controller 515 as synchronized metadata with each 3D image slice 705 (process block 610). In a process block 615, controller 515 uses the metadata to adjust the focal distance offset between projection lens 530 and display source 520. This focal distance offset can be manipulated either by changing the focal distance of projection lens 530 (e.g., voltage controlled liquid lens) or by physically manipulating the position of projection lens 530 relative to display source 520. By changing the focal distance offset between these elements, the magnification or image depth is adjusted. Once the image depth for the current 3D image slice 705 has been adjusted, display source 520 is driven to display the current 3D image slice 705 (process block 620). If the current 3D image slice 705 is not the last image slice in 3D frame set 700 (decision block 625), then the current 3D image slice 705 is sequentially incremented to the next 3D image slice 705 in order (e.g., X=X+1) (process block 630), and process 600 repeats. If the current 3D image slice 705 is the last image slice in 3D frame set 700 (decision block 625), then the current 3D image slice 705 is reset to the initial 3D image slice 705 (e.g., X=1) (process block 635), and process 600 repeats.

If the entire 3D frame set 700 is cycled through sufficiently quick (e.g., 30 times per second), then the human eye will perceive a constant 3D image. Although FIG. 7 illustrates 3D frame set 700 as including just four constituent 3D image slices 705, it should be appreciated that in practice a 3D frame set may include substantially more constituent slices.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted display (HMD) for displaying a computer generated image (CGI) to an eye of a user, the HMD comprising: a frame assembly for wearing on a head of the user; an integrated display module mounted to the frame assembly within a peripheral viewing region of the eye of the user when the HMD is worn by the user, the integrated display module including: a housing; a display source disposed in the housing for outputting the CGI; a lens system disposed in the housing and optically aligned with the display source to focus the CGI emitted from the integrated display module towards the eye in a near-to-eye configuration; and an actuator disposed in the housing and coupled to adjust an offset between the display source and a focal point of the lens system for changing an image depth of the CGI displayed to the user; a CGI engine coupled to the display source, the CGI engine to provide image data to the display source; and a controller coupled to the CGI engine to receive image metadata associated with each frame or groups of frames of the image data and coupled to the actuator to control manipulation of the image depth of the CGI emitted from the integrated display module in real-time based upon the image metadata.

2. The HMD of claim 1, wherein the integrated display module is mounted in a peripheral viewing region of the eye outside of a forward viewing region of the eye when the HMD is worn by the user.

3. The HMD of claim 2, wherein the integrated display module is mounted to a brow member of the frame assembly which positions the integrated display module proximate to an eyebrow of the user when the HMD is worn by the user.

4. The HMD of claim 3, further comprising a sliding track disposed on the brow member of the frame assembly, wherein the integrated display module is mounted to the sliding track such that the integrated display module may be horizontally repositioned along the sliding track to horizontally center the integrated display module with the eye of the user when the HMD is worn by the user.

5. The HMD of claim 3, further comprising a tilting mount disposed on the brow member of the frame assembly, wherein the integrated display module is mounted to the tilting mount such that the integrated display module may be tilted to aim the CGI emitted from the integrated display module at the eye when the HMD is worn by the user.

6. The HMD of claim 3, wherein the frame assembly comprises an eyeglass frame and the brow member comprises an upper frame member that encases an eyeglass lens.

7. The HMD of claim 1, wherein the display source comprises either an active display selected from the group consisting of an organic light emitting diode (OLED) array, a quantum dot array, and a light emitting diode (LED) array or a passive display selected from the group consisting of a liquid crystal on silicon (LCoS) display, a digital micro-mirror display, or a liquid crystal display (LCD).

8. The HMD of claim 1, wherein the display source comprises an array of macro-pixel groups, wherein each of the macro-pixel groups includes a group of at least three light emitting diodes (LEDs) each for emitting a different color of light.

9. The HMD of claim 8, further comprising an array of micro-lenses disposed over the array of macro-pixel groups, wherein each of the micro-lenses overlays the group of the at least three LEDs for a corresponding one of the macro-pixel groups.

10. The HMD of claim 8, wherein each LED within the array of macro-pixel groups is overlaid by a corresponding microlens.

11. The HMD of claim 1, wherein the actuator comprises one of a voice coil motor, a piezoelectric actuator, or a micro-electro-mechanical-system (MEMS) actuator coupled to manipulate a projection lens relative to the display source.

12. The HMD of claim 1, wherein the lens system comprises a liquid lens and the actuator comprises a voltage source for controlling an optical power of the liquid lens.

13. The HMD of claim 1, wherein the display source comprises an array of light emitting pixels disposed in a substrate and wherein the lens system comprises:
an array of microlenses disposed over the array of light emitting pixels; and
a projection lens disposed over the array of microlenses, wherein the actuator is coupled to manipulate a position of the projection lens relative to the array of light emitting pixels.

14. The HMD of claim 1, wherein
the image depth is manipulated by changing a position of a projection lens relative to the display source of the integrated display module.

15. The HMD of claim 14, wherein the image data comprises a pseudo three dimensional (3D) frame set including a plurality of image slices each having a different associated image depth setting and wherein the controller is further coupled to change the image depth based upon the different associated image depth setting for each of the image slices.

16. A head mounted display (HMD) for displaying a computer generated image (CGI) to an eye of a user, the HMD comprising: a frame assembly for wearing on a head of the user; an integrated display module mounted to the frame assembly within a peripheral viewing region of the eye of the user when the HMD is worn by the user, the integrated display module including a lens system optically aligned with a display source to focus the CGI emitted from the integrated display module and an actuator coupled to adjust a magnification of the CGI to change an image depth of the CGI displayed to the user; a control system disposed in or on the frame assembly and coupled to the display source to provide image data to the display source and coupled to the actuator to manipulate the image depth; and a storage medium coupled to the control system that stores instructions that, when executed by the control system, cause the HMD to perform operations comprising: generating image data; associating the image data with image depth settings; displaying the CGI based upon the image data; associating different frames of the image data with corresponding different image depth settings; manipulating the lens system in real-time based upon the image depth settings; and changing the magnification of the CGI when changing between the different frames of the image data.

17. The HMD of claim 16, wherein the image data comprises a pseudo three dimensional (3D) frame set having a plurality of image slices each having a different associated image depth setting, wherein displaying the CGI based upon the image data comprises repetitiously and sequentially displaying each the image slices, wherein manipulating the lens system in real-time based upon the image depth settings comprises adjusting an offset between a focal point of the lens system and the display source between each of the image slices based upon the different associated image depth setting.

18. The HMD of claim 16, wherein the image depth settings associated with the image data are context sensitive to items displayed within the CGI.

19. The HMD of claim 18, wherein at least one of the image depth settings comprises a textual depth setting for displaying textual messages, and wherein the magnification is adjusted based upon the textual depth setting when the CGI includes a textual message.

20. The HMD of claim 18, wherein at least one of the image depth settings comprises an icon depth setting for displaying icons, and wherein the magnification is adjusted based upon the icon depth setting when the CGI includes an icon.

21. The HMD of claim 18, wherein at least one of the image depth settings comprises a picture depth setting for displaying pictures, and wherein the magnification is adjusted based upon the picture depth setting when the CGI includes a picture.

22. The HMD of claim 16, wherein the integrated display module is mounted to a brow member of the frame assembly which positions the integrated display module proximate to an eyebrow of the user when the HMD is worn by the user.

23. The HMD of claim 22, further comprising a sliding track disposed on the brow member of the frame assembly, wherein the integrated display module is mounted to the sliding track such that the integrated display module may be horizontally repositioned along the sliding track to horizontally center the integrated display module with the eye of the user when the HMD is worn by the user.

24. The HMD of claim 22, further comprising a tilting mount disposed on the brow member of the frame assembly, wherein the integrated display module is mounted to the tilting mount such that the integrated display module may be tilted to aim the CGI emitted from the integrated display module at the eye when the HMD is worn by the user.

25. A method of displaying a computer generated image (CGI) to a wearer of a head mounted display, the method comprising: generating image data; associating the image data with image depth settings; displaying the CGI based upon the image data; associating different frames of the image data with corresponding different image depth settings; manipulating a lens system of the head mounted display in real-time based upon the image depth settings; and changing a magnification applied to the CGI when changing between the different frames of the image data.

26. The method of claim 25, wherein the image data comprises a pseudo three dimensional (3D) frame set having a plurality of image slices each having a different associated image depth setting, wherein displaying the CGI based upon the image data comprises repetitiously and sequentially displaying each the image slices, wherein manipulating the lens system in real-time based upon the image depth settings comprises adjusting an offset between a focal point of the lens system and a display source between each of the image slices based upon the different associated image depth setting.

* * * * *